United States Patent [19]
Lim et al.

[11] Patent Number: 4,705,398
[45] Date of Patent: Nov. 10, 1987

[54] PENTAGONAL RING LASER GYRO DESIGN

[75] Inventors: Wah L. Lim, Anaheim; James P. Hauck, Santa Ana; Jack W. Raquet, Hermosa, all of Calif.

[73] Assignee: Northrop Corporation, Hawthorne, Calif.

[21] Appl. No.: 736,035

[22] Filed: May 20, 1985

[51] Int. Cl.$^4$ .......................... H01S 3/083; G01B 9/02
[52] U.S. Cl. ...................................... 356/350; 372/94
[58] Field of Search .......................... 356/350; 372/94

[56] References Cited
U.S. PATENT DOCUMENTS 4,392,229 7/1983 Hostetler .............................. 372/94
4,481,635 11/1984 Broberg et al. ................. 356/350 X Primary Examiner—Stephen C. Buczinski
Attorney, Agent, or Firm—Terry J. Anderson; Robert B. Block

[57] ABSTRACT

A ring laser gyroscope incorporates a resonant cavity generally shaped as an irregular pentagon having a portion thereof conformed as three legs of a rectangle closed by two symmetrical other legs to form an apex. As result the enclosed area is increased, increasing sensitivity and decreasing lock-in, while magnetic effects are reduced. Additionally, the irregular shape allows for the extension of the gain medium which therefore increases the effectiveness thereof.

6 Claims, 6 Drawing Figures

PENTAGONAL RING LASER GYRO DESIGN

BACKGROUND OF THE INVENTION

1. Field of the Invention

The present invention relates to laser gyroscopes and more particularly to the geometric improvements therein.

2. Description of the Prior Art

In accordance with the present state of the art a laser gyroscope combines the operative characteristics of an optical resonator (laser) with relativistic effects to provide an instrument sensitive to angular rotation. The optical resonator is typically formed by a combination of a gain medium with reflective surfaces which, in the case of a laser gyroscope form a ring comprising three or more mirrors. These mirrors then set an optical path length which sets the frequency at which the resonator operates. The resonant wavelength, and thus frequency, for each beam is determined by the condition that an integral number of wavelengths fit exactly along the cavity perimeter. Rotation in inertial space about a line perpendicular to the plane of the cavity causes the cavity perimeter to exhibit differing lengths for the two opposite directions of optical beam propagation. Thus, the two beams have different frequencies which when superposed forms a beat frequency. This beat frequency or difference between frequencies is in proportion to the rate of rotation providing a measurement of the angular rate in inertial space.

In this form the beat frequency $\Delta f$ has a relationship to the angular rate w as follows:

$$\Delta f \cong 4Aw/lL$$

where A is the area enclosed by the optical ring, l is the resonating wave length and L is the perimeter length of the oscillating cavity. Since the wave length l is essentially a function of harmonics within the cavity length L the gain or sensitivity resolves as follows:

$$\Delta(f/w) = k(A/L)$$

Thus the maximum geometric gain effect is that of a circle.

In this form the ring laser gyroscope comprises two oscillators in a single cavity where the cavity length provides a direct effect on the gyro sensitivity or the net frequency differential (beat frequency) in response to angular rate. Like all oscillators operating in a single enclosure, ring lasers exhibit the characteristics of "mode pulling" and "lock in" where a certain dead band is inherent, i.e., a minimal frequency difference, which, once again, falls off with the area enclosed by the beam path. Accordingly, both the gain and dead band relate directly to the area enclosed and optimization of the area thus optimizes the gyroscope.

One aspect of lock-in is associated with the two linear polarization components, referred to as the S & P components, of the electromagnetic wave, respectively perpendicular and parallel to the ring laser plane. This polarization is such as to result in 0 degree phase shift at a mirror for the S component and 180 degree phase shift for the P component. There is therefore a 180 degree phase shift decoupling associated with all odd number mirror configurations.

Since the lasing or gain medium typically entails a plasma discharge one further phenomenon of lasers is magnetic sensitivity, expressed by the Zeeman effect wherein the magnetic field causes the excited electrons to split into two energy levels. This Zeeman splitting then causes a phase shift which is indistinguishable from frequency change with rotation.

Accordingly, a variety of phenomena encumber the operation of a ring laser, phenomena addressed in the past with singular solutions which often have not achieved complementary accommodation. A singular approach resolving all the foregoing phenomena has been sought in the past and it is one such approach that is disclosed herein.

SUMMARY OF THE INVENTION

Accordingly, it is the general purpose and object of the present invention to provide a ring laser configuration optimized for gain, dead band and magnetic sensitivity.

Other objects of the invention are to provide a ring laser having a resonator geometry which optimizes gain, dead band and magnetic sensitivity.

Yet further objects of the invention are to provide a ring laser gyroscope which is convenient in assembly and self compensating in magnetic fields.

Briefly, these and other objects are accomplished within the present invention by conforming the resonator path of a ring laser gyroscope to the general form of an irregular pentagon having three of its legs aligned as three sides of a rectangle with the remaining two legs forming a central apex thereover. In the foregoing resonator layout the center leg of the rectangular portion is conformed to include the gain medium implemented as a split discharge tube including a common cathode located centrally between two adjacent anodes.

The foregoing arrangement thus sets out an opposed DC discharge conformed for symmetry about a plane extending through the apex of the pentagon with the resulting effect of cancellation of any magnetic effects. Specifically, one should note that magnetic sensitivity is a function of the line integral of the magnetic field along the path of electric discharge. Since the two halves of the split discharge gain medium are opposite and parallel the magnetic effect, described as the Zeeman effect, cancels. Moreover, by confining the gain medium to the extent of one leg no mirrors are positioned in the plasma flow, which heretofore formed a major source of mirror erosion and damage. Since the rectangular geometry of a part of the pentagon forms the longest resonator segment in this base leg the longest geometry is available for the gain medium which thus maximizes the laser gain.

Additionally, this irregular pentagonal shape inserts a fifth mirror into the resonator path which, as previously set out, introduces a 180 degree phase shift to the P component of the polarized electromagnetic waves, thus inserting virtual Z/2 length increment between the polarized components to reduce the tendency for lock in therebetween.

Accordingly, by selecting an irregularly shaped pentagonal form for the resonating loop the advantages of a rectangular resonator are obtained together with the advantages of an odd number of mirrors. This shape, furthermore, optimizes the enclosed area A and thus optimizes angular rate sensitivity and lock in dead band.

DESCRIPTION OF THE PREFERRED EMBODIMENT

While the following description sets out in detail one illustration of the inventive ring laser, such is exemplary only and no intent to limit the invention is expressed by this selection of an example.

Figure 1:
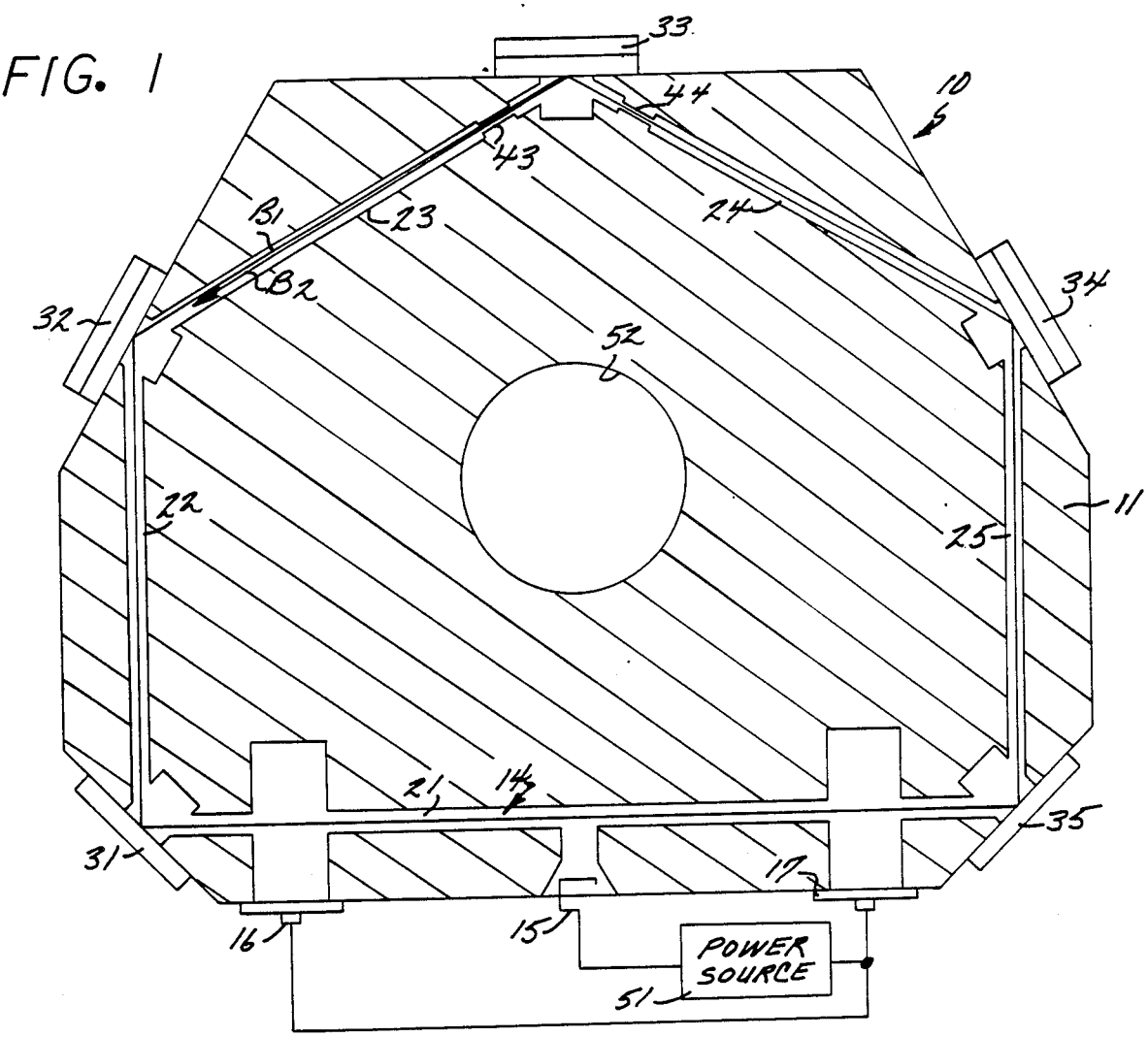
FIG. 1 is a plan view illustration, in diagrammatic form, illustrating a ring laser gyro constructed according to the present invention.

As shown in FIG. 1 the inventive ring laser gyroscope (gyro) generally designated by the numeral 10, is conformed as a unitary structure 11 of a thermally stable material like Zerodur in which a resonator loop is formed. This resonator loop includes a set of straight bores extending between five turning mirrors 31, 32, 33, 34 and 35 to form a pentagonal circuit.

More specifically, the resonator loop includes a base leg or base bore 21 extending between mirrors 31 and 35 communicating at either end with a corresponding orthogonally aligned lateral bore 22 and 25. In this form bores 21, 22 and 25 form three sides of a rectangle, with the longest side thereof extending along bore 21. By virtue of this geometric arrangement a gain medium 14, comprising a splint discharge tube formed by a common cathode 15 mounted between two adjacent anodes 16 and 17, is inserted into the longest bore or segment 21 for optimal length advantage.

At the other ends bores 22 and 25 align proximate mirrors 32 and 34 which turn by approximately 60 degrees the two counter resonating beams B1 and B2 into the adjoining bores 23 and 24 to complete the loop at mirror 33. Thus, a pentagonal loop is formed having a substantially rectangular portion comprising segments 21, 22 and 25 completed by the inclined segments 23 and 24. This loop is therefore symmetrical about the apex mirror 33 and cathode 15, satisfying the requirement of symmetry of ring laser gyros. To conserve symmetry either on-mirror or off-mirror symmetrical aperture insertion is provided, shown herein by apertures 43 and 44 adjacent the apex mirror 33.

Thus, a symmetrical, irregular pentagon having two orthogonal corners and two corners at about 60 degrees provides an area advantage of 0.865/0.605 relative a triangle and 0.865/0.785 relative a square. This results in improvements in lock-in dead band by about 25 percent over a triangular ring laser and about 15 percent over a rectangular ring laser. Concurrently, the irregular configuration provides an expanded leg for the insertion of the gain medium and the odd number of mirrors results in magnetic sensitivity due to mirror retardance of about 10 percent of that associated with a rectangular ring. Accordingly, this irregular pentagonal shape uniquely satisfies the competing advantages of prior art triangular and rectangular rings while at the same time the sensitivity and dead band are improved.

Figure 2A:
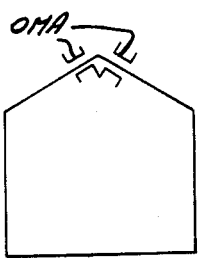
FIGS. 2a–e are diagrammatic illustrations of symmetrical aperture locations useful with the invention herein.
Figure 2B:
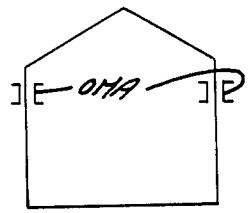
Figure 2C:
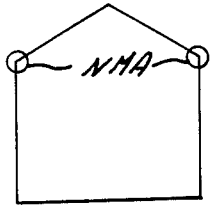
Figure 2D:
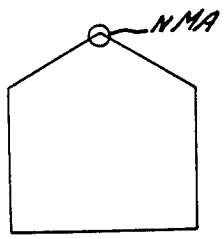
Figure 2E:
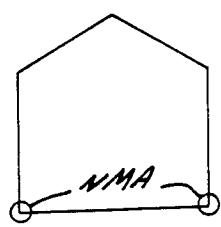

Since ring lasers typically use apertures to suppress higher order resonances the foregoing symmetrical pentagon ring lends itself to symmetrical on-mirror and off-mirror apertures shown in FIGS. 2a–e. As shown in these figures off-mirror apertures OMA can be symmetrically deployed as in FIGS. 2a and 2b while on-mirror apertures NMA are shown in FIGS. 2c, d and e.

Of course the foregoing ring laser includes the necessary power source 51 between cathode 15 and anodes 16 and 17 and may include a central dither mount 52 which, in a conventional manner, introduces angular motion beyond the dead band of the instrument.

Obviously many modifications and changes may be made to the foregoing description without departing from the spirit of the invention. It is therefore intended that the scope of the invention be determined solely on the claims appended hereto.

What is claimed is:

1. A ring laser gyroscope conformed as a closed resonator cavity into which oppositely directed laser beams are inserted, comprising:

said resonator cavity including an elongate base segment communicating with substantially orthogonal elongate lateral segments at the ends thereof, each said lateral segment communicating further with inclined elongate segments joined to each other to form an apex, to define a pentagonal cavity, a first electrode disposed at the middle of the base segment for carrying a first voltage, and opposing second electrodes disposed proximate the ends of the base segment for carrying second voltages, wherein the base segment and electrodes form a split discharge tube for producing said oppositely directed laser beams.

2. A ring laser gyroscope according to claim 1 wherein:

said base segment and said lateral segments define a portion of a rectangle symmetrical about said apex.

3. A ring laser gyroscope according to claim 2 wherein:

said base segment is of a longer dimension than said lateral segments.

4. In a gas ring laser gyroscope characterized by a closed resonating cavity into which oppositely directed beams are injected, said cavity including a plurality of elongate bores communicating with each other the improvements comprising:

said plurality of bores including a base segment communicating at the ends thereof with the one ends of orthogonal lateral segments, said lateral segments and said base segment, in combination, forming a portion of a rectangle, and inclined segments communicating with the other ends of said lateral segments joined in common to form an apex, said lateral, base and inclined segments cooperating to form a pentagonal cavity, a first electrode disposed at the middle of the base segment for carrying a first voltage, and opposing second electrodes disposed proximate the ends of the base segment for carrying second voltages, wherein the base segment and electrodes form a split discharge tube for producing said oppositely directed laser beams.

5. Apparatus according to claim 4 further comprising:

turning means mounted at the junctures of said base segment with said lateral segments, said lateral segments with said inclined segments and at said apex for directing said oppositely directed beams into said segments.

6. Apparatus according to claim 5 wherein:

said base segment includes a gain medium for producing said oppositely directed beams.

* * * * *